(12) United States Patent
Hall

(10) Patent No.: US 8,061,976 B2
(45) Date of Patent: Nov. 22, 2011

(54) VARIABLE GEOMETRY TURBOCHARGER, VANE RING ASSEMBLY WITH RETAINING MEMBER

(75) Inventor: Richard Dwayne Hall, Nebo, NC (US)

(73) Assignee: BorgWarner Inc., Auburn Hills, MI (US)

( * ) Notice: Subject to any disclaimer, the term of this patent is extended or adjusted under 35 U.S.C. 154(b) by 797 days.

(21) Appl. No.: 12/174,024

(22) Filed: Jul. 16, 2008

(65) Prior Publication Data

US 2009/0022580 A1 Jan. 22, 2009

Related U.S. Application Data

(60) Provisional application No. 60/949,909, filed on Jul. 16, 2007.

(51) Int. Cl.
*F02D 23/00* (2006.01)

(52) U.S. Cl. ......... 415/160; 415/163; 415/164; 415/166

(58) Field of Classification Search .................. 415/159, 415/151, 160, 163, 164, 166; 60/602
See application file for complete search history.

(56) References Cited

U.S. PATENT DOCUMENTS

| | | | |
|---|---|---|---|
| 5,186,006 A | 2/1993 | Petty | |
| 6,287,091 B1 | 9/2001 | Svihla et al. | |
| 6,558,117 B1 | 5/2003 | Fukaya et al. | |
| 6,679,057 B2 | 1/2004 | Arnold | |
| 7,021,057 B2 | 4/2006 | Sumser et al. | |
| 7,670,107 B2 * | 3/2010 | Barthelet et al. | 415/160 |

* cited by examiner

*Primary Examiner* — Dung A. Le
(74) *Attorney, Agent, or Firm* — William Anderson; Stephan A. Pendorf; Patent Central LLC

(57) ABSTRACT

A vane ring assembly which includes a lower vane ring (23), an upper vane ring (31), one or more guide vanes (80) positioned at least partially between the vane rings, and a plurality of spacers (49, 50 or 59) positioned between the lower and upper vane rings (23, 31) for maintaining a distance between the lower and upper vane rings, the vane ring assembly being retained in a turbine housing (102) by a retaining ring (400) which is located in a groove (510) in the turbine housing.

10 Claims, 21 Drawing Sheets

VARIABLE GEOMETRY TURBOCHARGER, VANE RING ASSEMBLY WITH RETAINING MEMBER

FIELD OF THE INVENTION

This invention is directed to a turbocharging system for an internal combustion engine and more particularly to a design of a VTG system for allowing simplified assembly of components of the turbocharger as well as reduced deformation due to differential thermal expansion.

BACKGROUND OF THE INVENTION

Turbochargers are a type of forced induction system. They deliver compressed air to the engine intake, allowing more fuel to be combusted, thus boosting the engine's horsepower without significantly increasing engine weight. This can allow for the use of a smaller turbocharged engine, replacing a normally aspirated engine of a larger physical size, thus reducing the mass and aerodynamic frontal area of the vehicle. Turbochargers use the exhaust flow from the engine to drive a turbine, which in turn, drives the air compressor. At startup, the turbocharger may be at temperatures well below 0° C. Since the turbine turns at extremely high speed, in the range of 150,000 RPM to 300,000 RPM, is mechanically connected to the exhaust system, it sees high levels of temperature, up to 1050° C. for a gasoline engine, and vibration. Such conditions have a detrimental effect on the components of the turbocharger. Because of these adverse conditions the design, materials and tolerances must be selected to provide adequate life of the assembly. The design selections, required to satisfy these conditions, often lead to larger than preferred clearances, which, in turn, cause aerodynamic inefficiencies. Further, the flow of exhaust gasses impart rotational torque on the vane assembly, which must be prevented from rotation by mechanical securing means.

Turbochargers, which utilize some form of turbine flow and pressure control are called by several names and offer control though various means. Some have rotating vanes; some have sliding sections or rings. Some titles for these devices are: Variable turbine design (VTG), Variable geometry turbine (VGT), variable nozzle turbine (VNT), or simply variable geometry (VG). The subject of this invention is the rotating vane type of variable turbine which will be referred to as VTG for the remainder of this discussion.

VTG turbochargers utilize adjustable guide vanes FIG. 7 (80), rotatably connected to a pair of vane rings (30), (20) and/or nozzle wall. These vanes are adjusted to control the exhaust gas backpressure and the turbocharger speed by modulating the exhaust gas flow to the turbine wheel. The vanes are rotatably driven by the fingers (61), which are located above the upper vane ring (30). For the sake of clarity, these details have been omitted from the drawings. VTG turbochargers have a large number of components which must be assembled and positioned in the turbine housing so that the guide vanes remain properly positioned with respect to the exhaust supply flow channel, and the turbine wheel, over the range of thermal operating conditions to which they are exposed. Typical VTG turbochargers employ three fasteners (FIG. 8, 111, 112, 113) which are either studs, bolts, or studs with nuts, to secure the vane ring assembly (e.g., the vane ring and guide vanes) to the turbine housing (100) so that the turbine housing assembly surrounds the vane ring assembly. The fasteners pass through both vane rings to clamp the upper vane ring, to the spacer, the spacer to the lower vane ring, and the lower vane ring to the turbine housing.

The connection of such an assembly to the turbine housing produces several important issues: The parallelism of the vane ring assembly to the turbine housing (see FIG. 8; the vane rings (20) and (30)) must be parallel to the turbine housing (100)). The vanes (80) must be placed such that the vane cheek surfaces (81) are adjacent to and parallel to the upper and lower vanes rings. The turbine housing machined face (101) must be machined in the correct axial location for the vanes to line up with the turbine flow. In FIG. 9, the angular location of the vane ring assembly to the turbine housing datum, is determined by the radius from the centerline of the bore of the turbine housing, and a set of coordinate dimensions (124). These dimensions determine the X-Y-Z location of the vane assembly to the turbine housing.

The effect of temperature on the turbine housing results in both thermal expansion (at the rate of the coefficient of thermal expansion for the iron or steel of the turbine housing or respective part being heated) influenced by the thermal flux caused by the flow path of the exhaust gas, which is additionally influenced by the geometry and wall thickness of the turbine housing. The inherent nature of a turbine housing, under thermal influence is for the "snail section" to try to unwind from its cold shape and position. This often results in a twisting motion, dependant upon the constraints of the casting geometry. Unconstrained, by attachment to the turbine foot, gussets or ribs, the turbine housing large apertures, which are cylindrical at room temperature, assume an oval shape at operating temperature.

This relatively simple thermal expansion, combined with the results of the geometric and thermal flux influences, results in complex deformation of the turbine housing across the temperature range.

When an assembly, such as the vane ring assembly, is mounted to the turbine housing wall as in FIG. 1 and FIG. 4, the studs or bolts (8, 13) will assume the motion of said wall, albeit in a manner somewhat perpendicular to said wall. When the turbine housing wall moves due to thermal influences, the mountings will mimic that movement. In FIG. 10, the fasteners (111), (112), (113) are each held in perpendicular position by the tapped holes (136), (134), (137) in the turbine housing (100).

A simple case of distortion in the turbine housing mounting face (101) has a large effect, offset, but perpendicular to the turbine housing mounting face as in FIG. 11. The base position (B) of the fasteners (121), (122), (123), determined by the tapped holes in the turbine housing, on pitch circle diameter (PCD) (125) in FIG. 9, changes a small amount due to the change from flat to curved of the turbine housing mounting face (101). It can be seen however, in FIG. 11 that the dimension "A" at top end of the fasteners moves considerably more, than does the dimension "B" at the bottom end of the fastener. The angular position of the fasteners, relative to the datum (126) stays relatively constant. In a like manner the distortion of the turbine housing could be convex, instead of concave, which would result in the dimension "A", at the top end of the fasteners, moving in a direction which produces a top end dimension being less than the bottom end dimension "B". The important detail is the deformation and motion, not the direction of deformation, and resultant motion.

This displacement of the fastener causes distortion in the vane rings which then causes the vanes and moving components to stick. If the clearances between components are made greater in order to reduce the propensity of the vanes to stick, the excessive clearances cause a loss of aerodynamic efficiency, which is unacceptable. The clearance between vane side faces, and their partner vane ring side faces is especially critical to aerodynamic efficiency. The displacement of the fasteners also generates high stress in the fastener, which results often in failure of the fastener. Unusual wear patterns, due to distortion in the vane ring, also generate unwanted clearances, which further reduce the aerodynamic efficiency.

Tapped holes are a reasonably efficient manufacturing method but are simply not effective when it comes to dimensional accuracy or repeatability. While it is normal practice to generate acceptable accuracy and repeatability with drilled or reamed holes, the threading activity is fraught with problems. The threaded region of both the fastener and the hole has to be concentric with the unthreaded zone of the shaft and hole in order to place the fastener in the appropriate X-Y position with respect to the hole. By the very nature of threads it is usual for the male feature to lose its perpendicularity to the female feature (and vice versa) as increased torque applied to the fastener rocks the un-torqued portion of the fastener towards the thread angle, which has the effect of tipping the fastener, in the case of a male stud or bolt in a female hole, away from perpendicular to the threaded surface plane.

In U.S. Pat. No. 6,558,117 to Fukaya, a VTG turbocharger is shown having a vane ring assembly integrally connected to the turbine housing via bolts. The Fukaya device is shown in FIGS. 2, 3 and 4, and has a turbine casing (1), rotatable guide vanes (2), a flow passage spacer (3), a bill-like projection portion (4) and a turbine rotor (5). Each of the guide vanes (2) is supported by a rotational shaft (7) extending outward of a guide vane table (6). A bolt (8) extends through the guide vane table (6) and the flow passage spacer (3), and is fastened to the casing (1).

To account for thermal deformation of the casing (1) and the guide vane table (6), an outer diameter of the Fukaya flow passage spacer (3) must be set to about 9 mm. Fukaya also uses material selection to combat thermal expansion. A material having the same coefficient of linear expansion as that of the guide vanes (2) (for example, SCH22 (JIS standard)) is employed for a material of the flow passage spacer (3) and the bolt (8). A width $h_s$ of the flow passage spacer (3) is designed to be slightly larger than a width $h_n$ of the guide vanes (2), and an attempt is made to minimize the gap between both of the side walls of the casing (1) and the guide vane table (6) sectioning the turbine chamber, and the guide vanes (2).

Due to the integral connection of the housing (1) with the vane table (6), the Fukaya turbocharger suffers from the drawbacks of having to allowing gaps to account for thermal growth. Such gaps reduce the performance of the turbocharger. The Fukaya turbocharger also requires the use of material with low thermal coefficients of expansion. Such materials can be costly and difficult to work with.

Fukaya further proposes another variable geometry turbocharger as shown in FIGS. 3 and 4. Three bolts (13) each having an outer diameter of 5 mm are arranged at positions uniformly separated into three portions in a peripheral direction. The bolt (13) extends through a portion of the guide vane table (6) that extended to the casing (1) side and fastens the guide vane table (6) to the casing (1). A heat resisting cast steel HK40 (ATSM standard) having a little amount of carbon is employed for a material of the casing (1), the guide vane table (6) and the guide vane (2). A distance between both of the side walls of the casing (1) and the guide vane table (6) is defined by $h_a - h_b$, and is designed to be slightly larger than the width $h_n$ of the guide vane (2).

While this other embodiment of Fukaya removes the fasteners from the flow path, it still provides an integral connection of the housing (1) with the vane table (6), which will result in the transfer of stresses and/or growth from the casing to the vane ring components. The Fukaya turbocharger also requires the use of material with low thermal coefficients of expansion. Such materials can be costly and difficult to work with.

In U.S. Pat. No. 6,679,057 to Arnold, a variable turbine and variable compressor geometry turbocharger is described as shown in FIG. 5. Each of the turbine vanes is connected to the turbine housing via a vane post. The vane post is inserted into a correspondingly sized hole in the turbine housing. The Arnold device also suffers from the drawback of radial thermal expansion of the turbine housing imparting undue stress and/or movable components "sticking" due to the use of the vane post connection in the housing.

In U.S. Pat. No. 7,021,057 B2 to Sumser, an exhaust-gas turbocharger with a VTG vane structure is described as shown in FIG. 6 in which spacer bushes (21) are provided to ensure that there is a defined minimum distance between the outer support wall (11) and the inner support wall (14). The variable turbine vane structure is fixed by means of bolts (22), which extend between the end section (17) of the support wall (14) and the support wall (11). Also here, the vane ring components will suffer thermal stresses imparted by the turbine housing die to the fixed structure.

U.S. Pat. No. 5,186,006 to Petty, references cross cut keys as a method for the mounting of a ceramic shell defining a turbine housing onto a metal engine block using a set of ceramic cross cut keys connected to a second set of cross cut keys on a metal spider bolted to the engine block.

U.S. Pat. No. 6,287,091 to Svihla et al, references radial keys and guides to be used in aligning the nozzle ring of an axial turbocharger for a railway locomotive.

FIG. 19 depicts the centering drive from a Cosworth DFV, or DFX racing engine. These engines were first produced in 1967 and have been in general production for some 40 years. This drive mechanism is used to provide drive to the oil and water pumps on the sides of the engine, irrespective of the thermal conditions of either pump. The temperature of the fluids in the pumps cause the pumps to expand or contract against the engine block, thus changing the centerlines of the pumps, relative to the driving flange which is also solidly mounted to the engine block, albeit under a different set of thermal conditions. So in most cases the center of the flanges is not concentric with its mating flange, but the design enables a vibration free drive to take place.

In this design the driving flange (182) is screwed onto a driving shaft (187) connected by belt drive to the engine crankshaft. The driving flange features a radial male key (186), which engages into a female radial slot (185) in the cross-key coupler (180). In this embodiment of the cross-key design, the coupler has two diametral keys, one male (185) and one female (184) at an angle of 90° to each other. The driven flange (181) features a male key (180) machined into its face. The male key engages in the female slot (184) in the coupler (180). The coupler is held in axial position only by the proximity of the driving, and driven, flanges. The coupler is held in radial position by the action of the two mating keys and keyways in the opposing flanges. Thus the coupler provides a centerline drive from the driving flange (182) to the driven flange (181).

Thus, there is a need for a fastening system and method for connecting the vane ring assembly to the turbine housing. There is a further need for such a system and method that accounts for thermal growth and distortion of the turbine housing and/or vane ring assembly while maintaining peak efficiency. There is yet a further need for such a system and method that is cost effective and dependable. There is a need for a need for a system of parts that allows elimination of costly studs or bolts. There is additionally a need for such a system and method that facilitates manufacture, assembly and/or disassembly.

SUMMARY OF THE INVENTION

The exemplary embodiments of the vane ring assembly effectively decouple the assembly of the vane ring from the turbine housing and eliminate the potential for vanes to stick due to relative movement through thermal growth, as is experienced when the lower and upper vane support rings are rigidly affixed to each other and the turbine housing via studs, bolts, and the like. The exemplary embodiments provide a fastening system and method for connecting the vane ring assembly to the turbine housing that negates the effect of thermal growth, or the effects of differential thermal growth, of the housing and/or vane ring assembly while maintaining efficiencies. The exemplary embodiments are cost effective, dependable, and are designed for ease of assembly.

One embodiment employs a retaining ring, which retains the upper vane ring of the vane ring assembly by providing an axial location above the upper vane ring. Another embodiment provides the axial location by the use of a retaining member within the upper vane ring and the turbine housing.

Still another embodiment includes a belville spring washer above or below the upper vane ring such that a small axial force is applied to the upper vane ring, of the vane ring assembly to more securely locate the vane ring assembly under all conditions.

There are various methods of spacing the upper and lower vane rings such that the spacing between the upper and lower vane rings, and the vanes within is managed as required.

BRIEF DESCRIPTION OF THE FIGURES

The present invention is illustrated by way of example and not limitation in the accompanying drawings in which like reference numbers indicate similar parts, and in which.

DETAILED DESCRIPTION OF THE INVENTION

Figure 1:
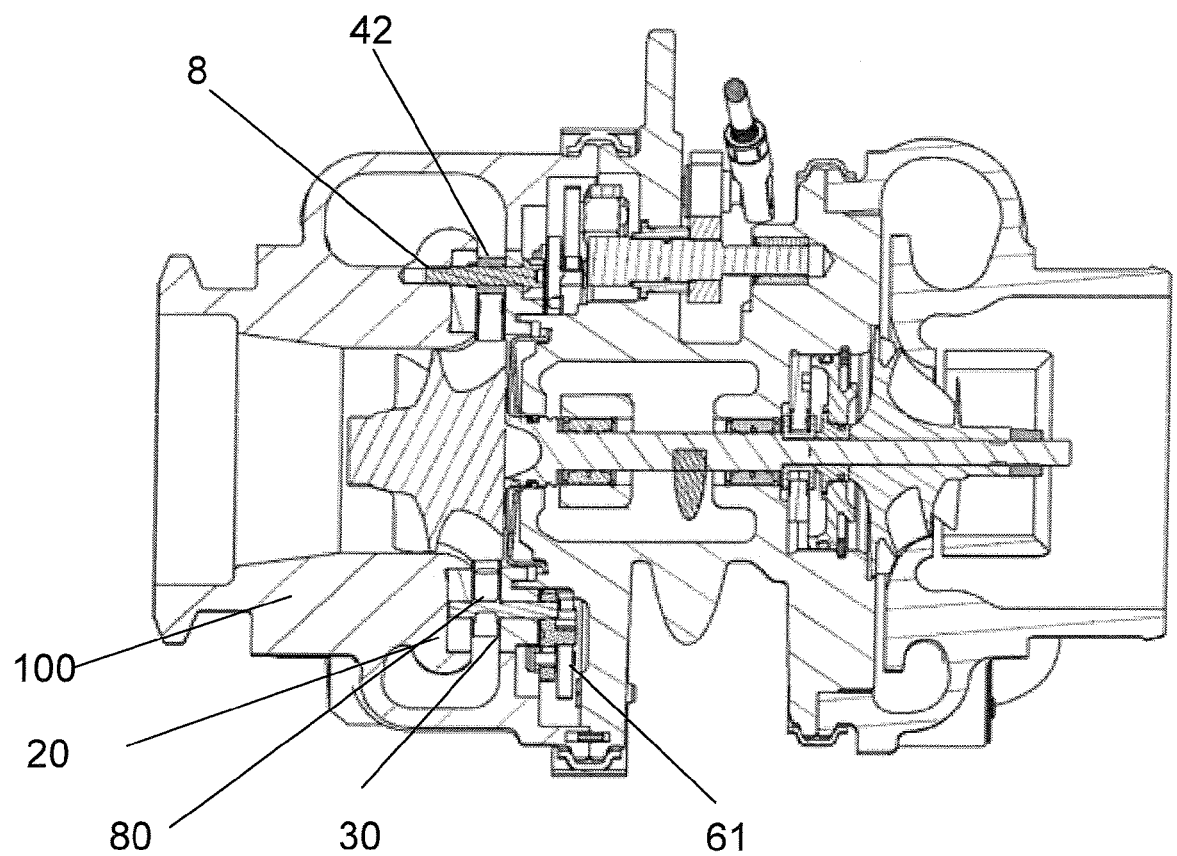
FIG. 1 is a cross sectional view of a VTG turbocharger.
Figure 2:
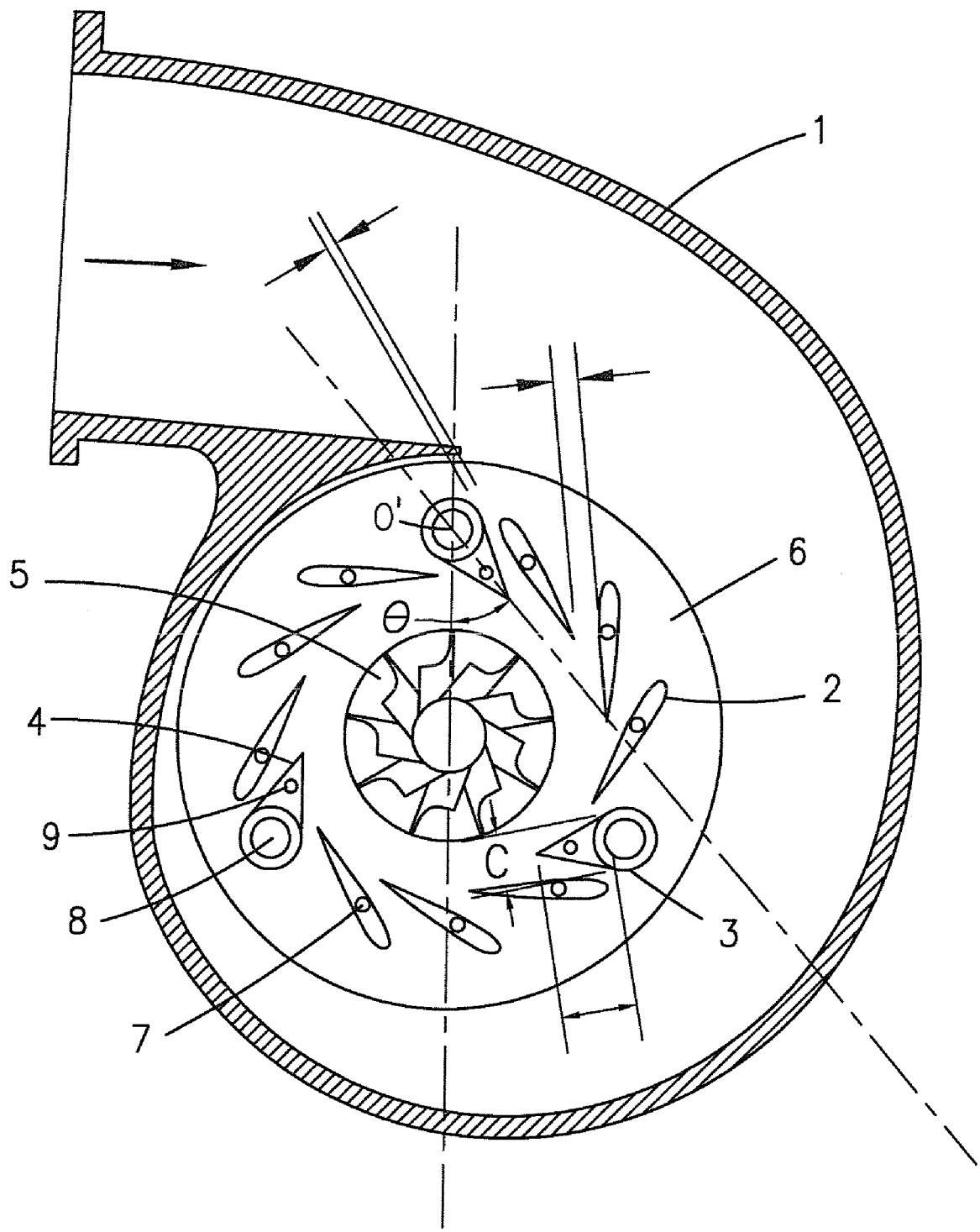
FIG. 2 is a cross-sectional view of a turbine portion of a contemporary turbocharger system according to U.S. Pat. No. 6,558,117.
Figure 3:
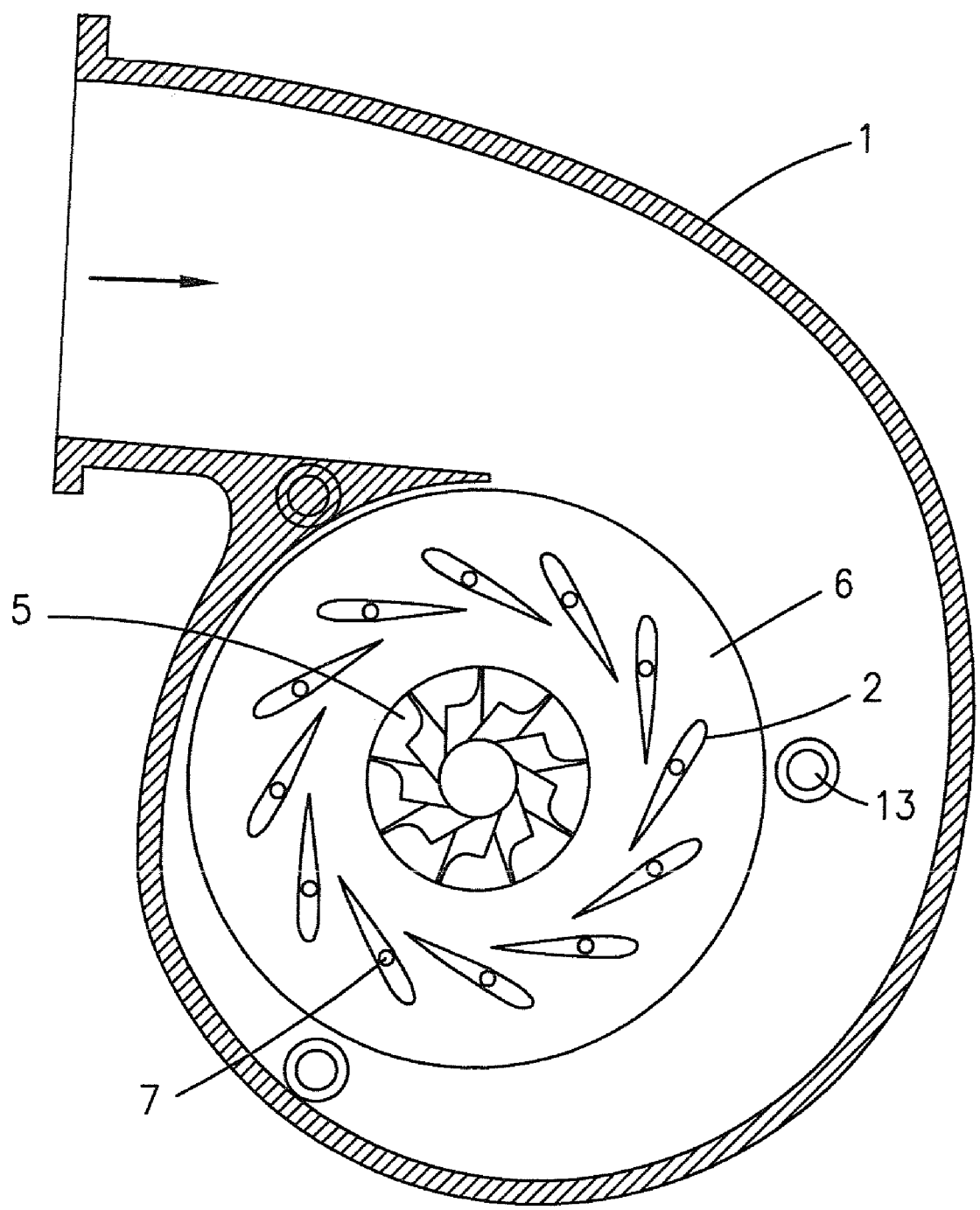
FIG. 3 is a cross-sectional view of a turbine portion of another contemporary turbocharger system according to U.S. Pat. No. 6,558,117.
Figure 4:
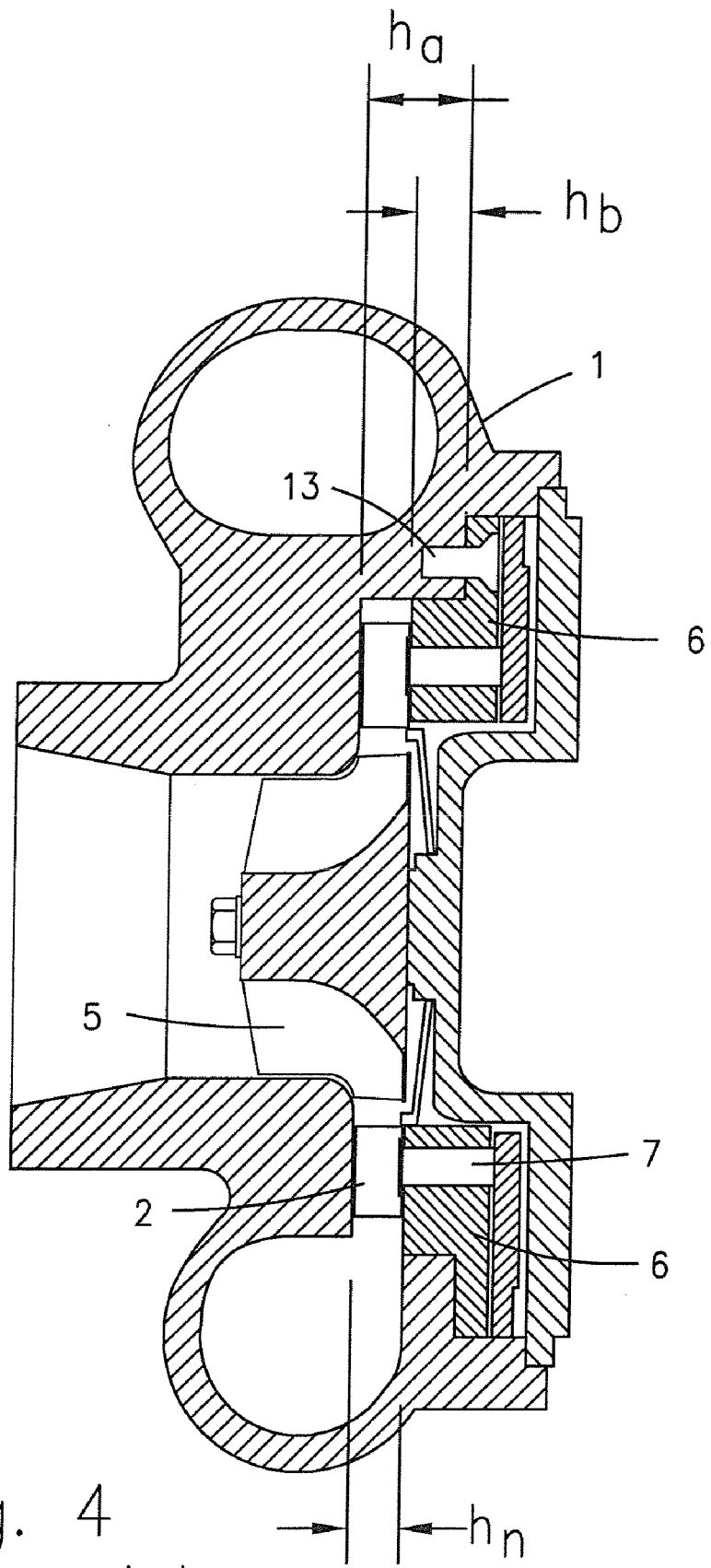
FIG. 4 is an enlarged cross-sectional view of a portion of the contemporary turbine portion of FIG. 3.
Figure 5:
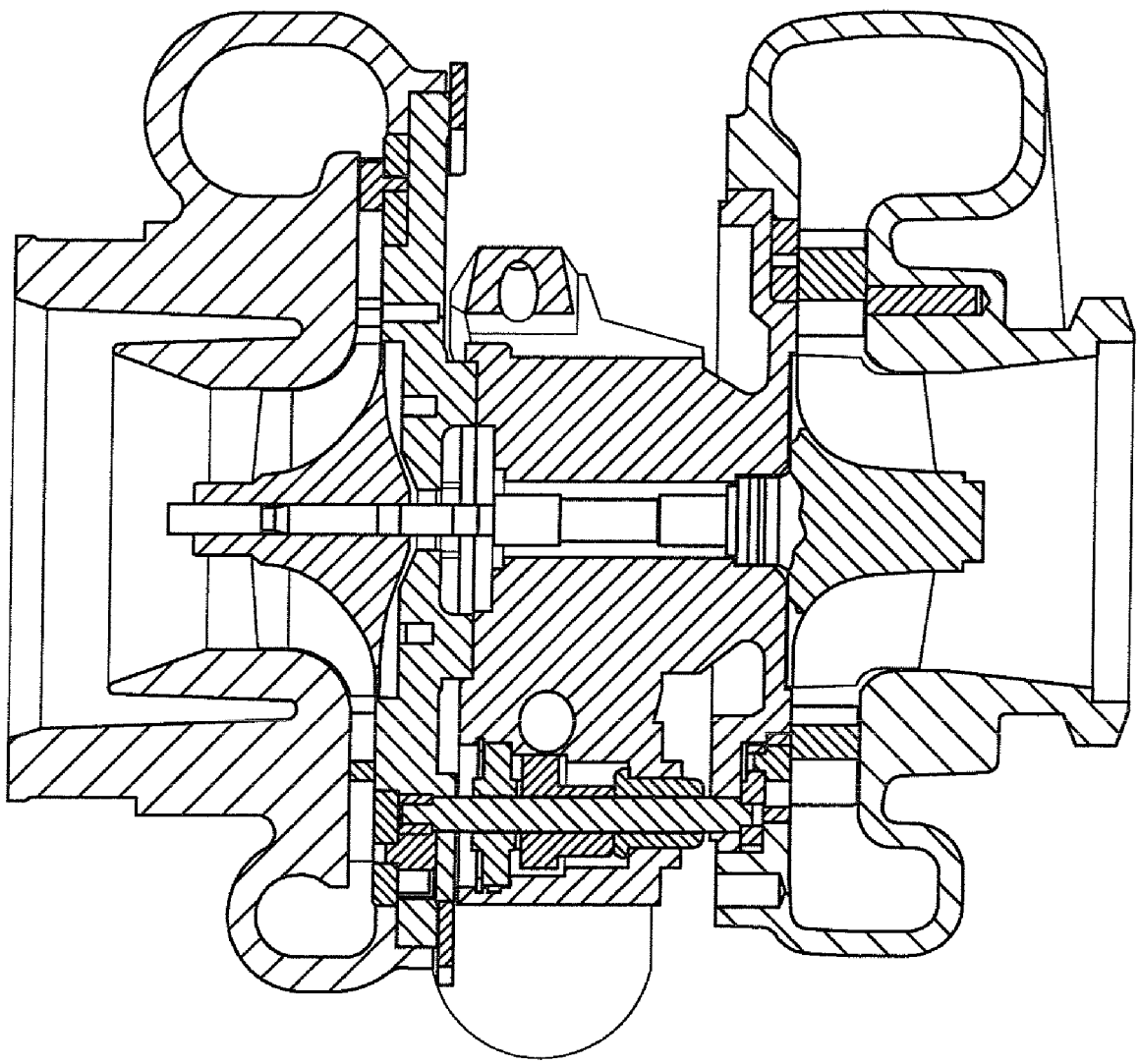
FIG. 5 is a cross sectional view of another contemporary turbocharger system according to U.S. Pat. No. 6,679,057 to Arnold, 2004.
Figure 6:
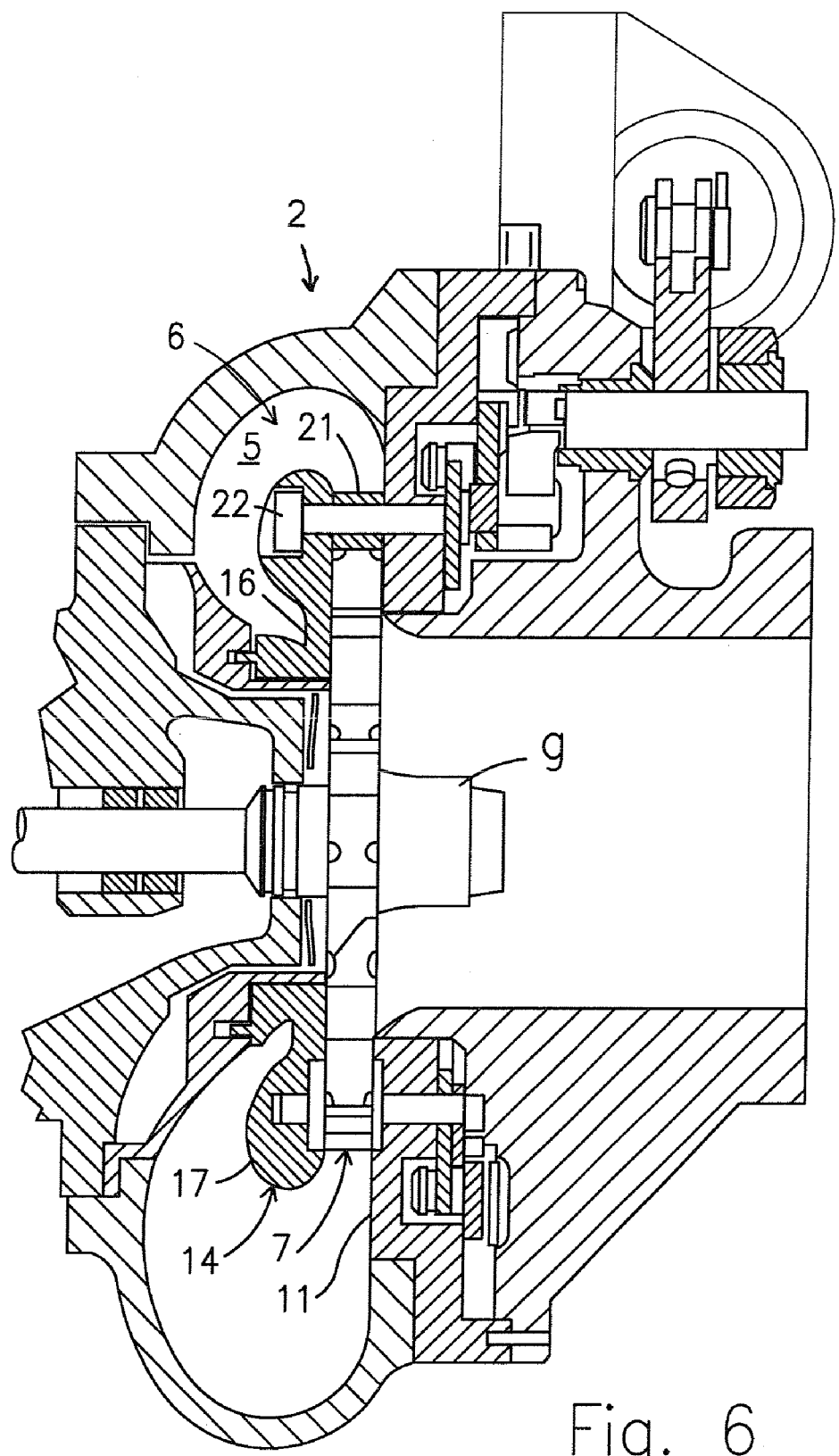
FIG. 6 is a cross sectional view of another contemporary turbocharger system according to U.S. Pat. No. 6,287,091 to Svihla.
Figure 7:
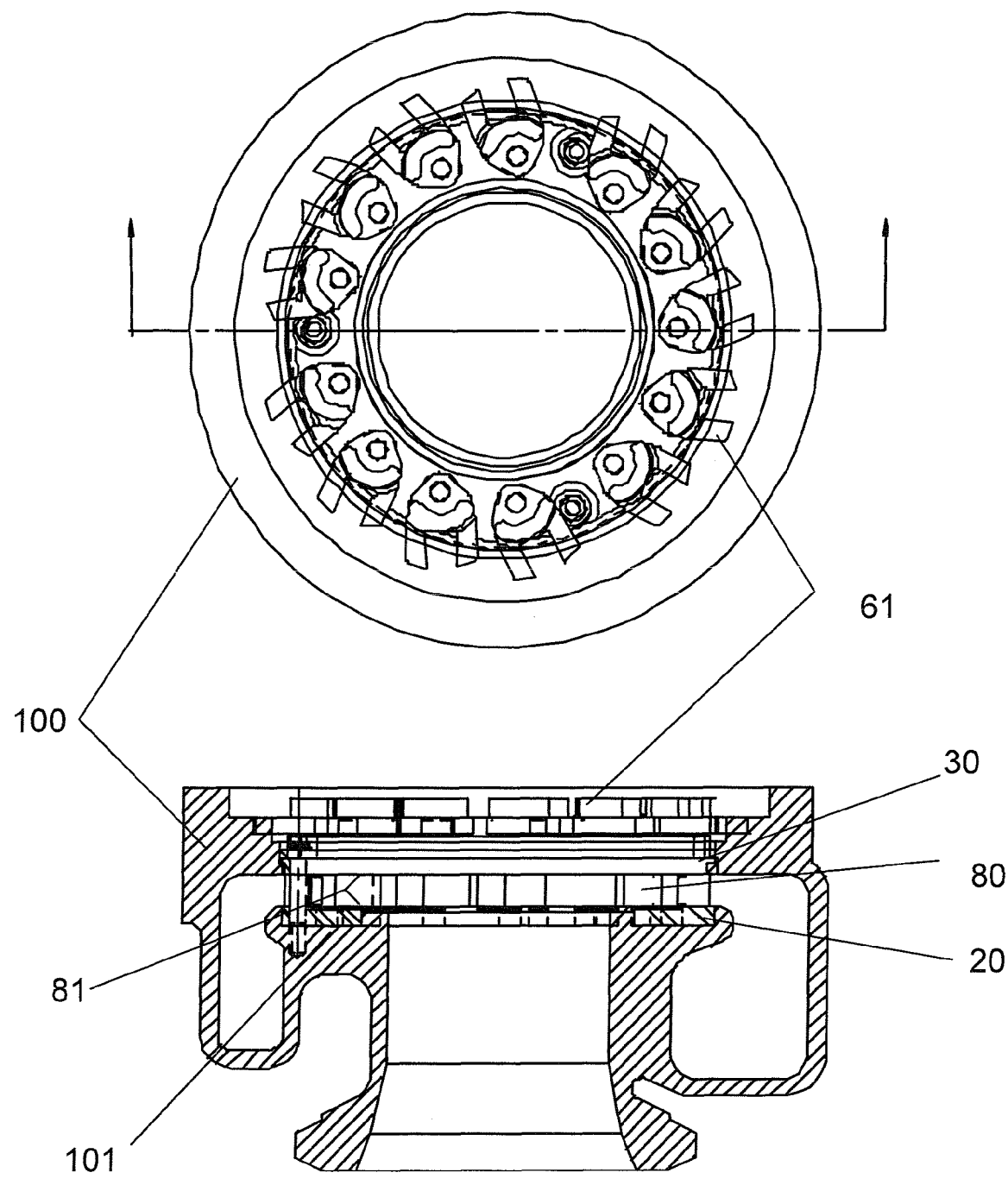
FIG. 7 is a plan view, with an elevation view of the driving fingers on the top side of an upper vane ring. This view is omitted for clarity in subsequent views.
Figure 8:
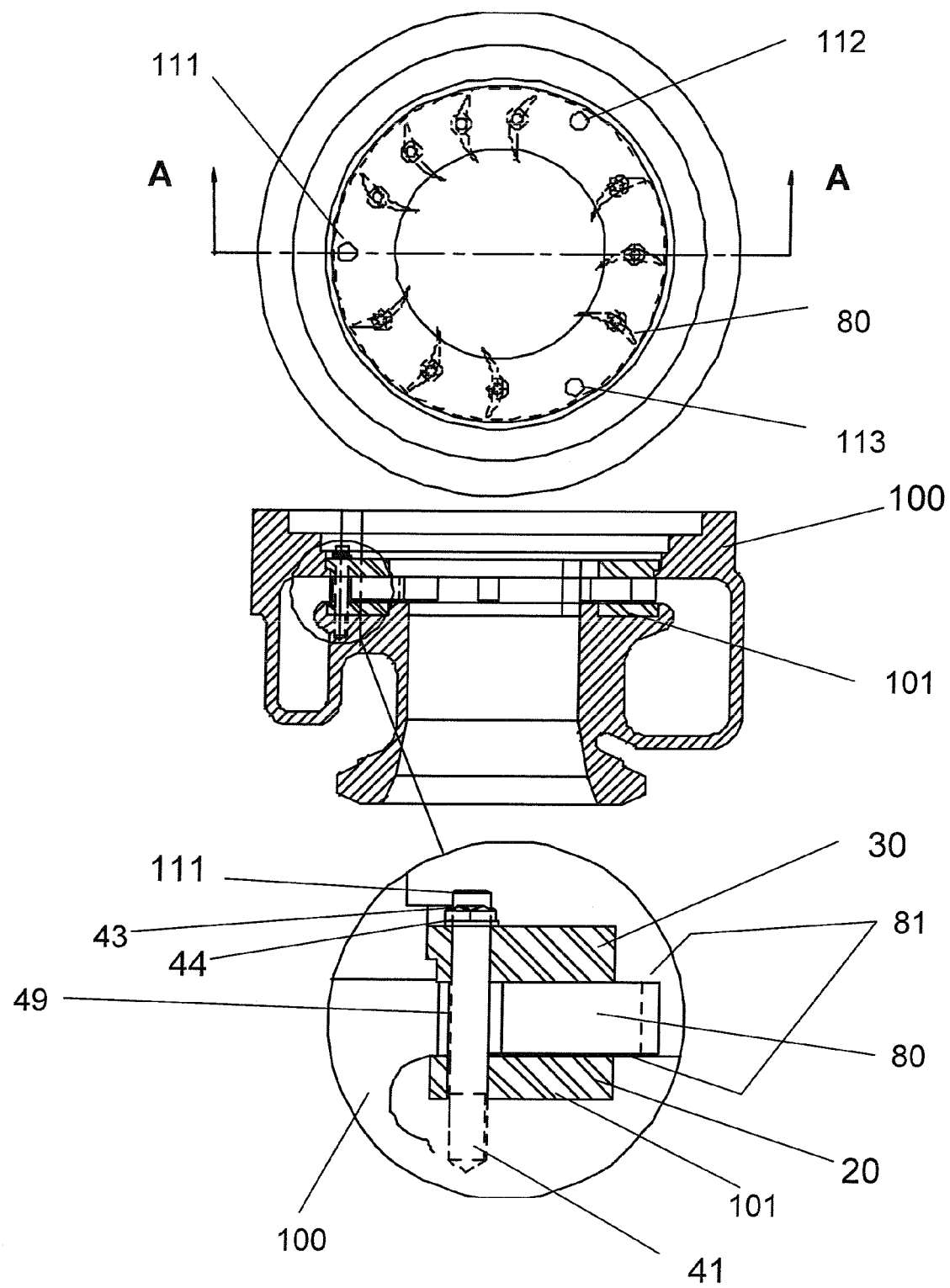
FIG. 8 is cross-sectional view of section A-A of a vane ring assembly with a standard spacer with a magnified view of the vane ring—spacer detail.
Figure 9:
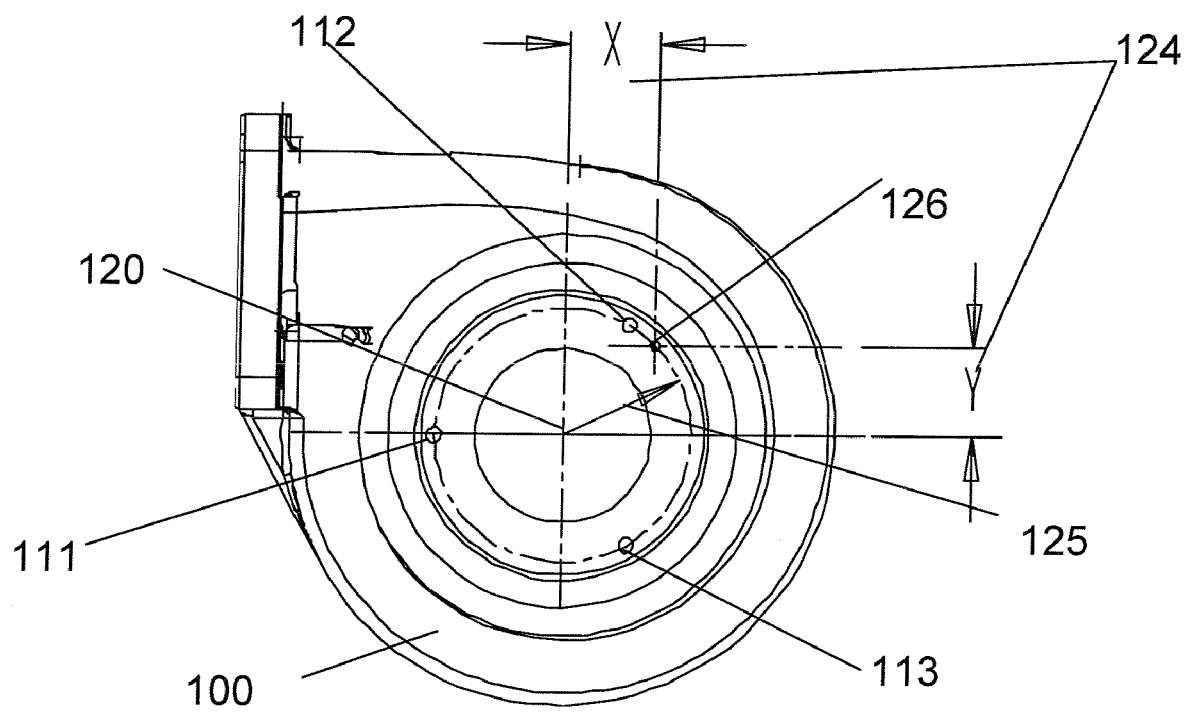
FIG. 9 is a plan view of the turbine housing with the layout of the fastener tapped holes and the datum.

A turbocharger has five major component groups: A compressor housing; a turbine housing; a center section, incorporating the bearing system and providing support and location for the turbine housing and compressor housing; and the compressor and turbine wheels. Within the turbine housing assembly there exists the upper vane ring (30) supporting a plurality of VTG vanes (80) which are sandwiched between the upper vane ring (30) and the lower vane ring (20) such that a spacer (49, 50, 59) locates the vanes rings in the axial relationship with each other with the distance between each vane ring set by the combination of: in the case of a stepped spacer, the distance between the steps on the spacer (50) and the counterbores in each of the upper and lower vane rings. In the case of a non-stepped spacer (49) the distance between end-faces of the spacers and the faces of the lower and upper vane rings.

To control the width of the vane space, which is the distance of the lower vane ring (23) from the upper vane ring (31), one or more spacers (50) can be positioned therebetween. The spacers can be spaced about the lower and upper vane rings. In the exemplary embodiment, three spacers are used, but the present disclosure contemplates the use of other numbers of spacers.

Figure 12:
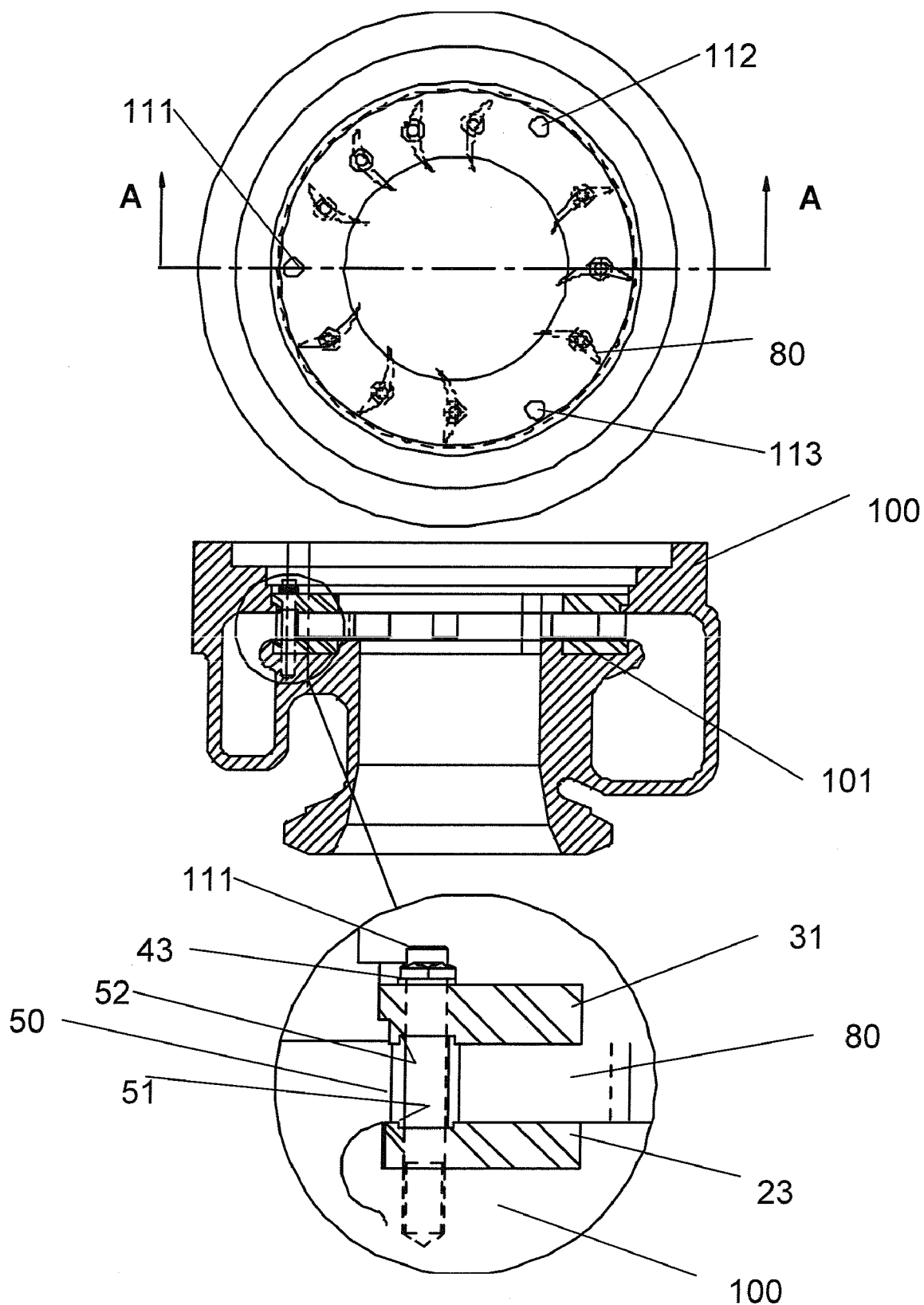
FIG. 12 is cross-sectional view of section A-A of a vane ring assembly with a stepped spacer and a magnified view of the vane ring—spacer detail.

The spacers (49, 50, 52) can be stepped. In FIG. 12 the lower end (58) of the spacer (50) has a stepped feature (51), which locates in a like feature in the lower vane ring (23). The upper end of the spacer has a stepped feature (32), which locates in a like feature in the upper vane ring. The opposing ends are of reduced diameter as compared to the middle section of the spacer. The spacers can be press-fit into their locations formed in the lower and upper vane rings. The spacers can be loose, or retained in some other fashion. What is important is that they control the distance between the vane rings, and thus the side clearance to the vanes. The holes can be through-holes, or blind holes and any combination thereof. The particular size, shape, number, and configuration of spacers can be chosen based on a number of factors including ease of assembly, excitation of the turbine wheel, stiffness and thermal deformation control. The choice of material for the spacers can be based on several factors, including thermal coefficient of expansion, machinability, corrosion resistance, cost, strength and durability.

Figure 14:
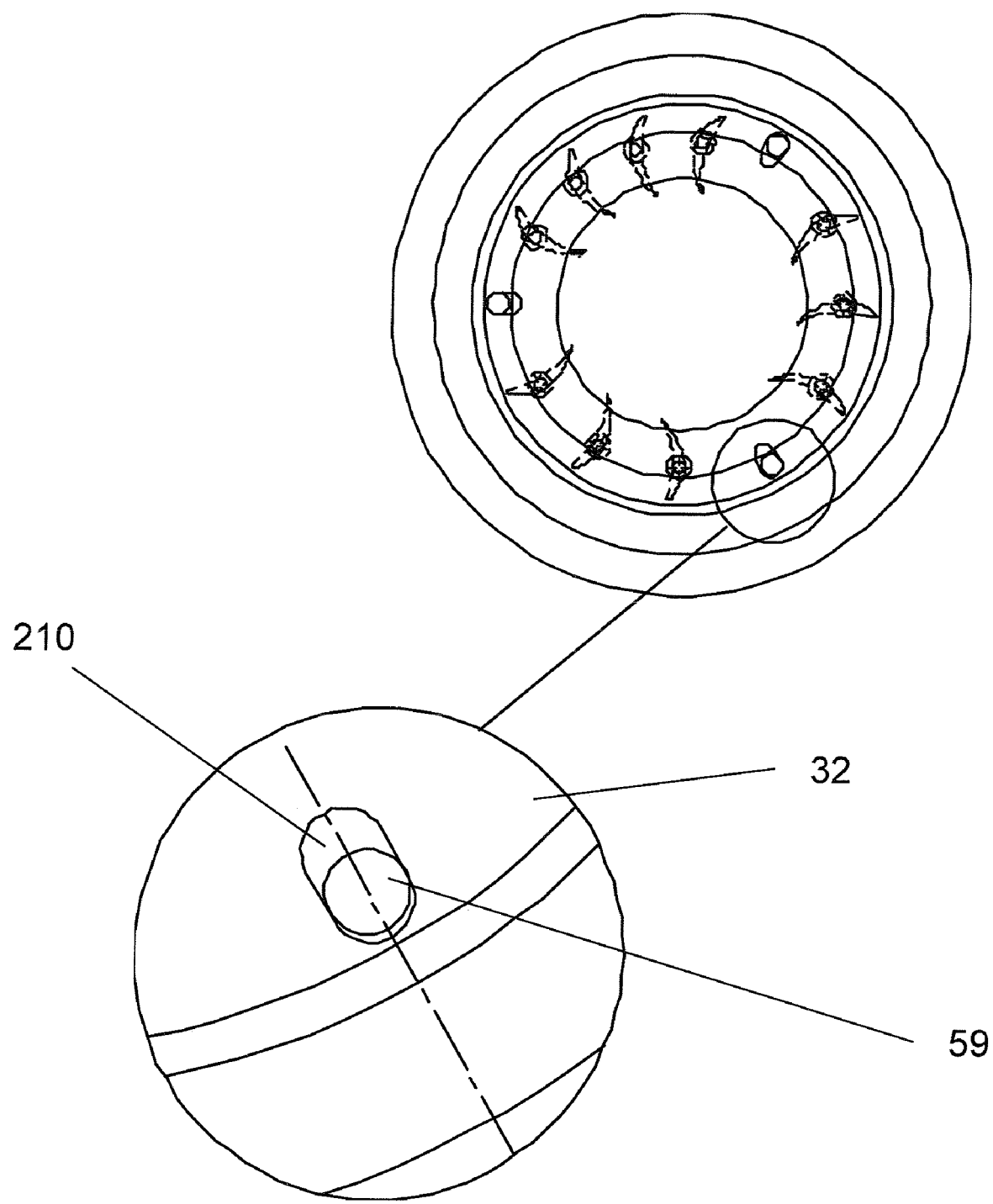
FIG. 14 is a plan view of a slot in the vane ring with a magnified view of the detail for clarity.

In the exemplary embodiment, shown in FIG. 14 holes (210) are a slotted shape that allows for the thermal expansion described above. The shape of the holes (210) acts as a guide for the radial thermal expansion of either or both of the rings (24, 32) with respect to the spacer (59) and the turbine housing (100). To allow for non-radial thermal expansion, which is known sometimes to be the case (the unconstrained turbine housing tries to become oval) the slot could assume a curved shape.

Figure 15:
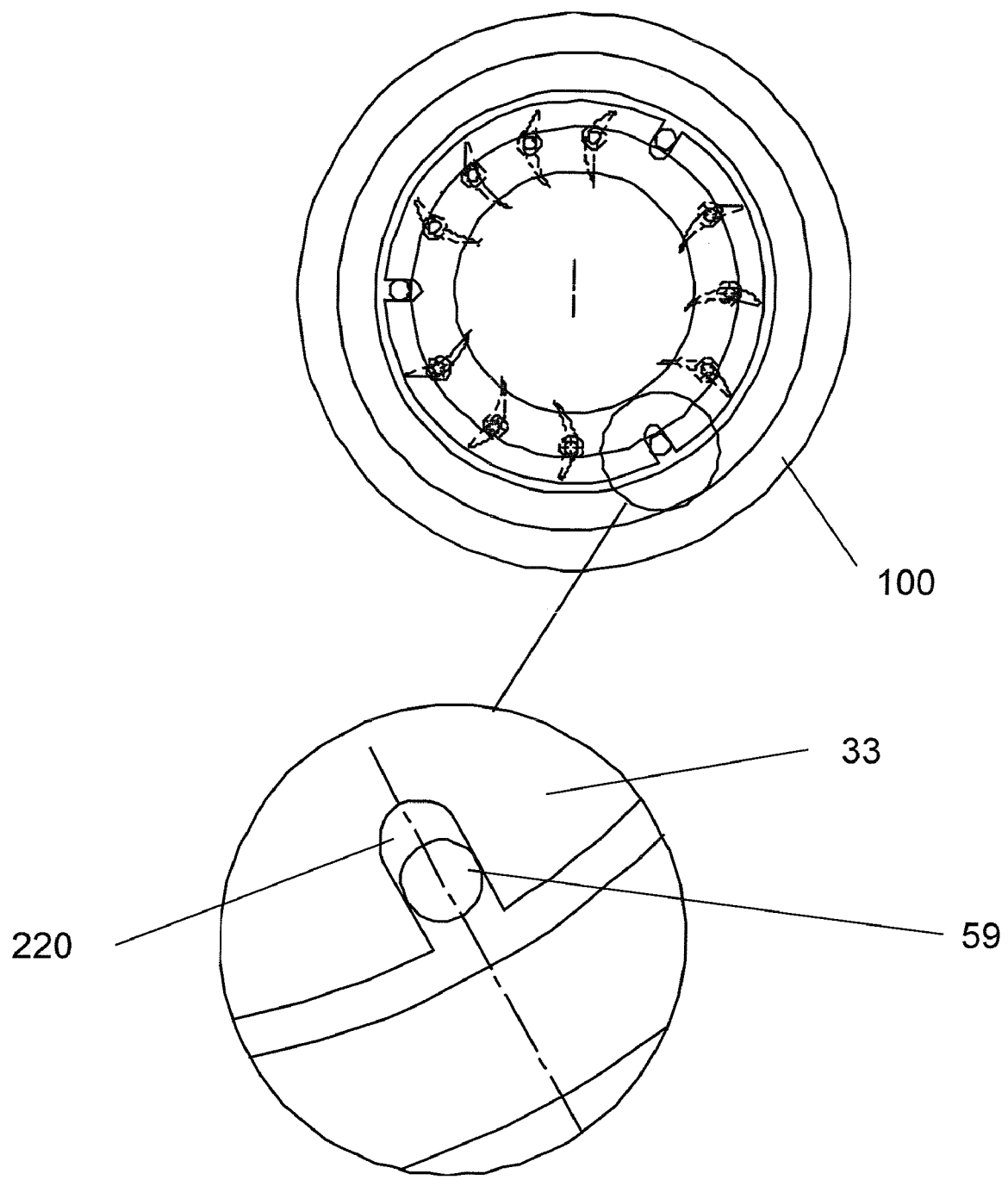
FIG. 15 is a plan view of an open slot in the vane ring with a magnified view of the detail for clarity.

Another exemplary embodiment for the connection between the spacers (50) and the lower and upper vane rings (24) and (32) is shown in FIG. 15. Holes (220) can be formed along a periphery of each of the support rings (25, 33) and can be open along a circumference of each of the rings. The holes (220) can be through-holes, although the present disclosure also contemplates the holes being blind-holes, as well as combinations of each. Preferably, the holes (220) have a slotted shape (FIG. 13) so that each of the rings (25, 32) with respect to the spacer, can undergo radial thermal expansion while maintaining the spacing between the vane rings. To allow for non-radial thermal expansion, which is sometimes known to be the case (the unconstrained turbine housing tries to become oval) the slot could assume a curved shape.

Figure 16:
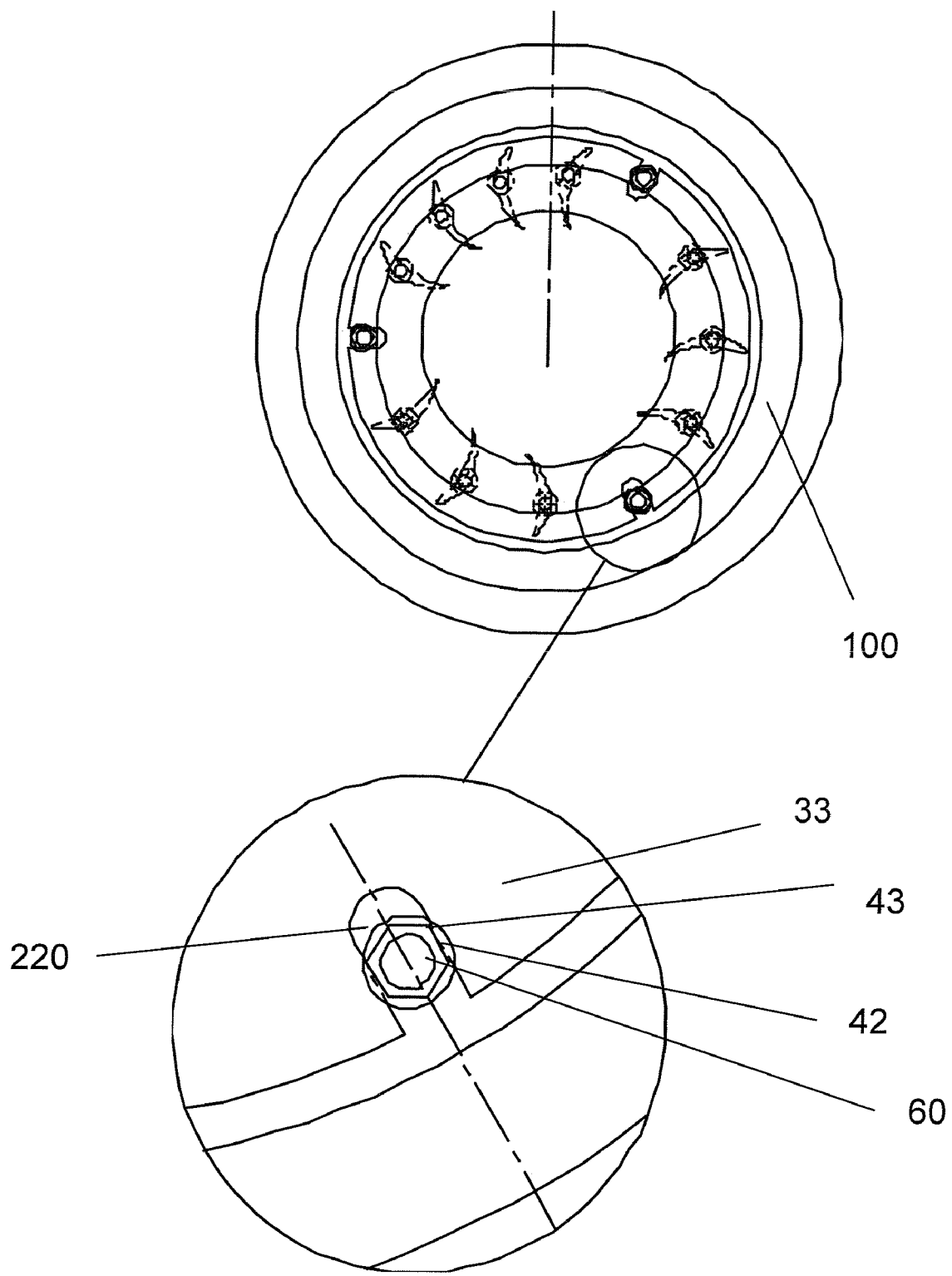
FIG. 16 is a plan view of the slot in the vane ring, retained by a fastener, with a magnified view of the detail for clarity.

In yet another exemplary embodiment (FIG. 16), the spacers (60) that are usable with the holes (210, 220) described above, can have connecting structures on one or both ends. The connection structure can be a fastener feature at a first end and a fastener feature at a second end. The fastener feature could be threads, which can be connected to a lock nut or other corresponding connecting structure. In this exemplary embodiment, the spacers (60) can connect and control the spacing between the vane rings while still allowing for radial thermal growth. The embodiment allows for a secure pre-assembly of the vane ring assembly, e.g., the lower and upper vane rings and with the vanes therebetween, via the spacer to facilitate assembly with the rest of the components of the turbocharger. The spacers affix the lower and upper vane rings, in an axial direction.

The turbocharger is subjected to temperatures in excess of 1050° C. accompanied by high frequency vibration since it operates in the range of 150,000 to 300,000 RPM. These conditions generate thermal profiles, which are not conducive to close tolerance components, which require minimal distortion in order to not stick or wear.

Figure 13:
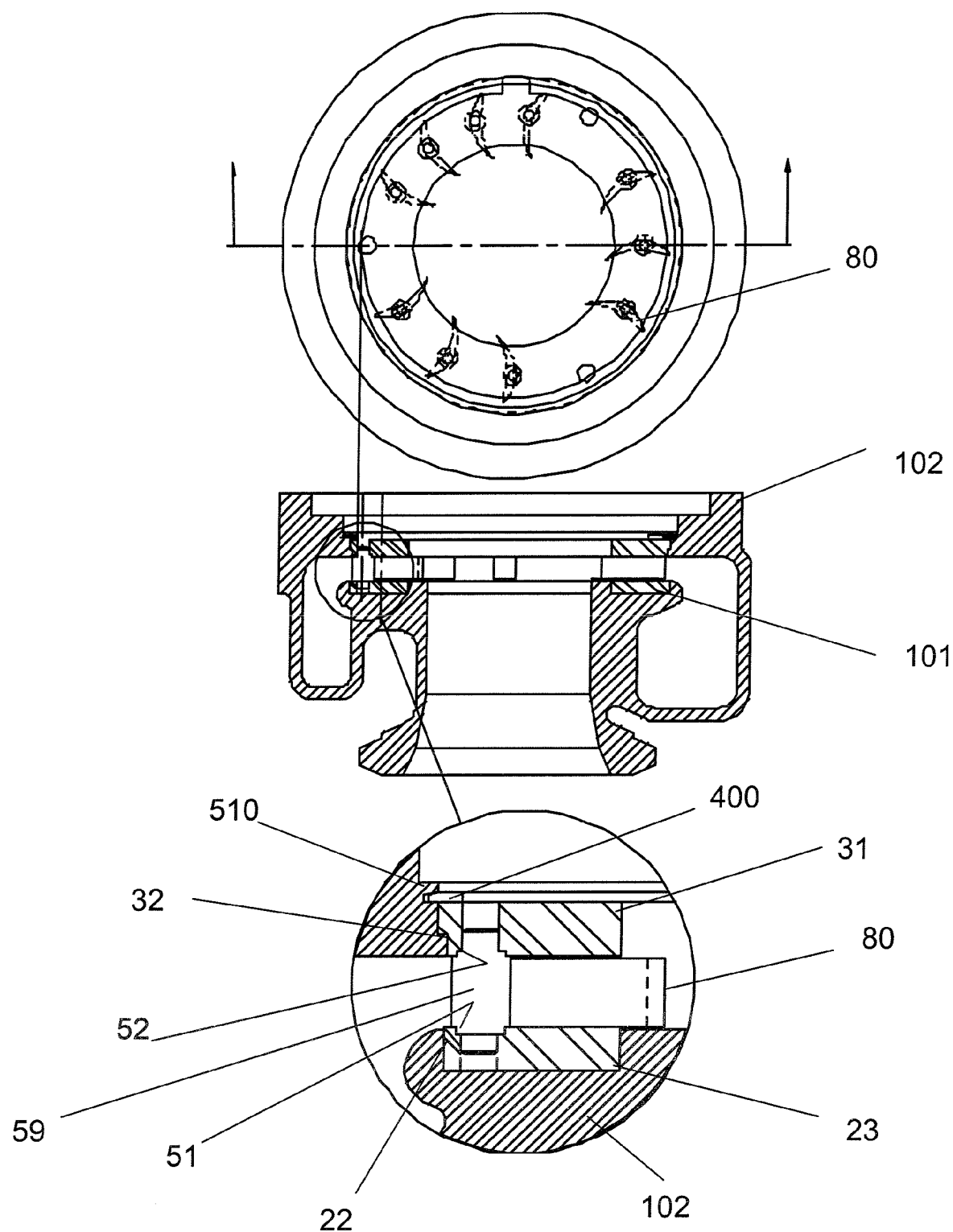
FIG. 13 is cross-sectional view of section A-A of a vane ring assembly with a retaining ring, and a magnified view of the vane ring—retaining ring detail.

To allow this condition to exist without problems the vane ring assembly is retained in the turbine housing (102) with a retaining ring (400), which locates in a groove (510) machined into the turbine housing (see FIG. 13). In this groove is located a retaining ring (400) which projects inwards, towards the center of the vane ring and turbocharger to control the axial location of the vane ring assembly.

Figure 20:
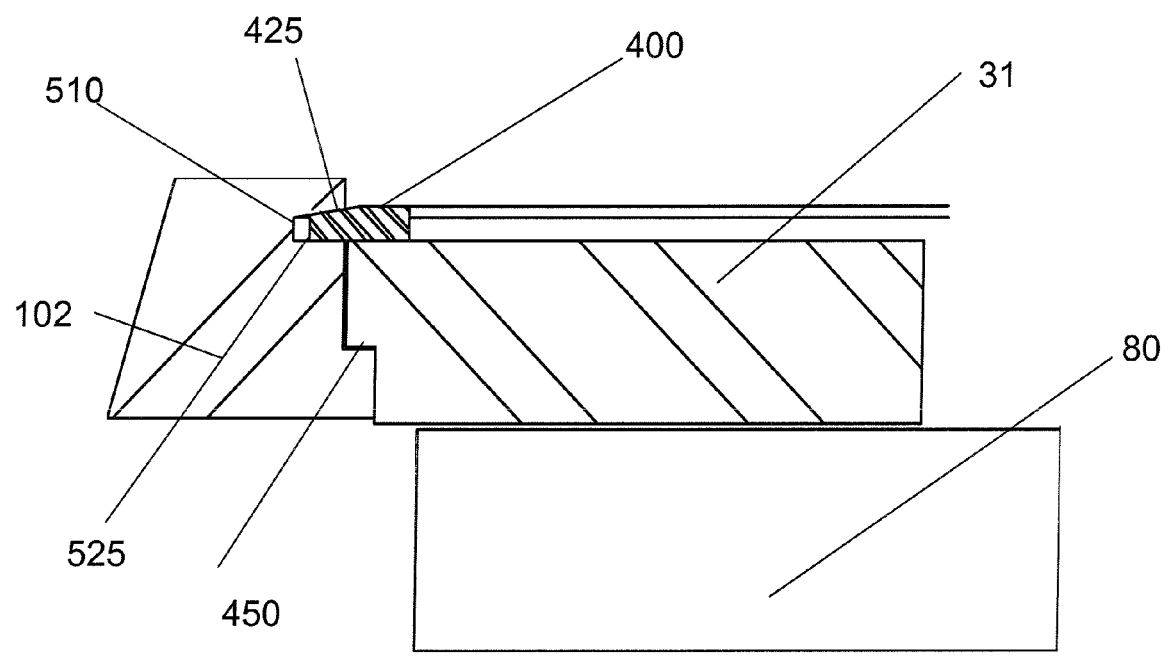
FIG. 20 is a magnified view of the retaining ring installation.

FIG. 20 is a magnified view of the retaining ring installation. The retaining ring (400) preferably has an angled or chamfered edge (425), to facilitate assembly of the ring in the groove (510). The turbine housing groove (510) can have a corresponding angled surface (515) that mates with the angled side (425) of the retaining ring. The particular size and shape of one or more of the retaining ring (400) housing groove (510) can be chosen based upon a number of factors including, flexibility, strength, ease of assembly, ease of machining or other formation, durability and thermal growth. The angled, or chamfered region provides a ramp against which diametral expansion of the retaining ring results in the ring being driven axially towards the vane rings, thus more tightly retaining said vane rings.

The choice of material for the retaining ring (400) can be based on several factors, including flexibility for ease of assembly, thermal coefficient of expansion, Thermal stability functions, machinability, cost, strength and durability. Various tools, techniques and the like can be used to assemble and/or disassemble the snap or retaining ring (400) with the groove (510). Preferably, the retaining ring (400) is a snap ring which is removable from the groove (510) without destruction of any portion of the snap ring, or the groove.

The retaining ring (400) allows for limited radial movement of the turbine housing (102) with respect to the vane assembly, while still connecting the housing and vane ring assembly in the axial direction. The retaining ring (400) also provides for ease of disassembly such as during service or remanufacturing teardown operations. The retaining ring (400) also allows for a tight tolerance along the diametral abutment region (450) between the turbine housing (102) and the vane ring assembly. By providing a tight tolerance along abutment region (450), a robust seal is provided to reduce or eliminate leakage of the exhaust gas past the upper vane ring (31).

Figure 21:
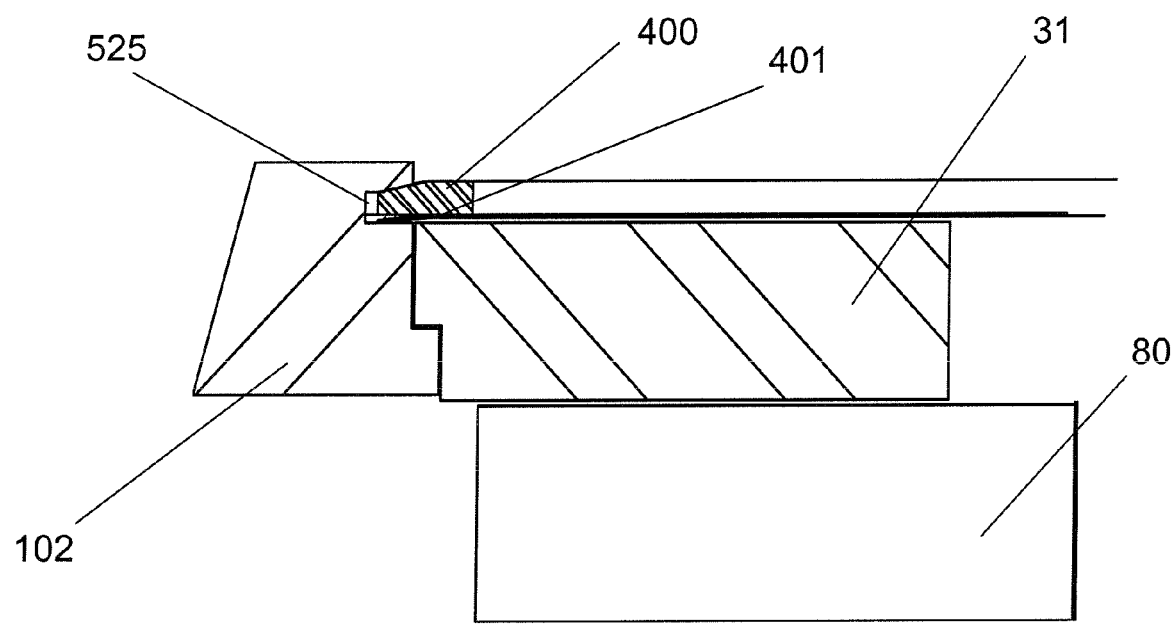
FIG. 21 illustrates an embodiment including a spring loaded belville washer.

An embodiment of this design (FIG. 21) is to add a belville washer (401), either under, or over the retaining ring (400). The spring loaded belville washer adds to the axial load on the vane ring under all conditions, which prevents the vane ring, or vane ring assembly from vibrating, or moving from its axial position.

Figure 10:
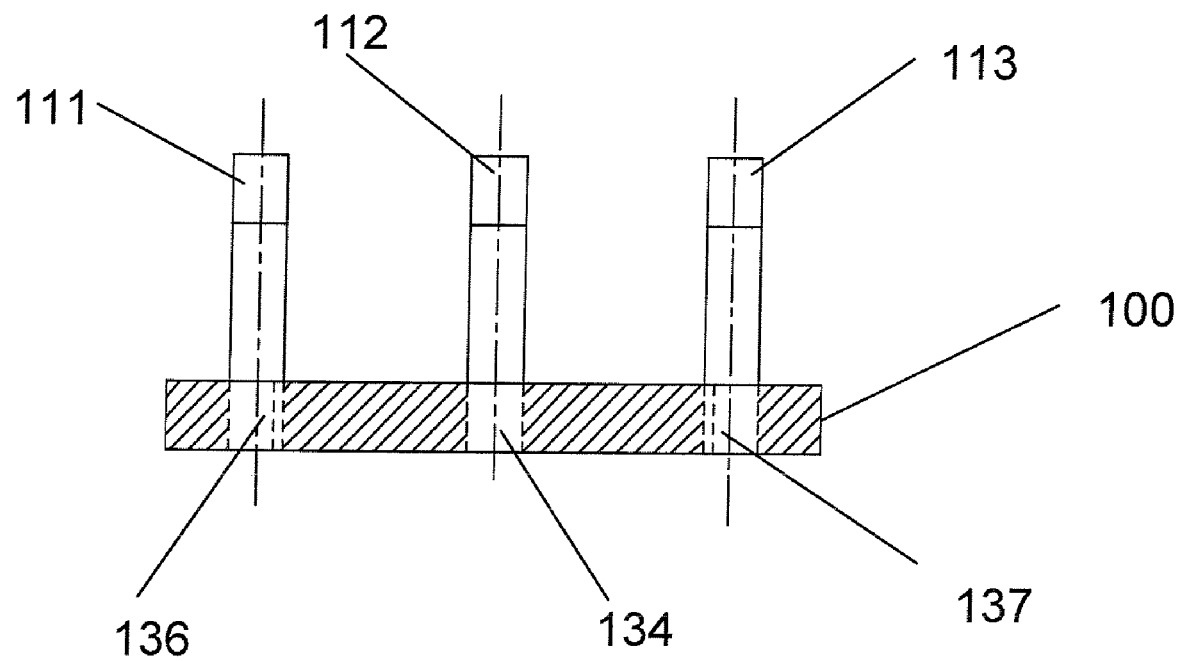
FIG. 10 is a simplified cross sectional elevation, of the 3 studs mounted in a turbine housing.
Figure 11:
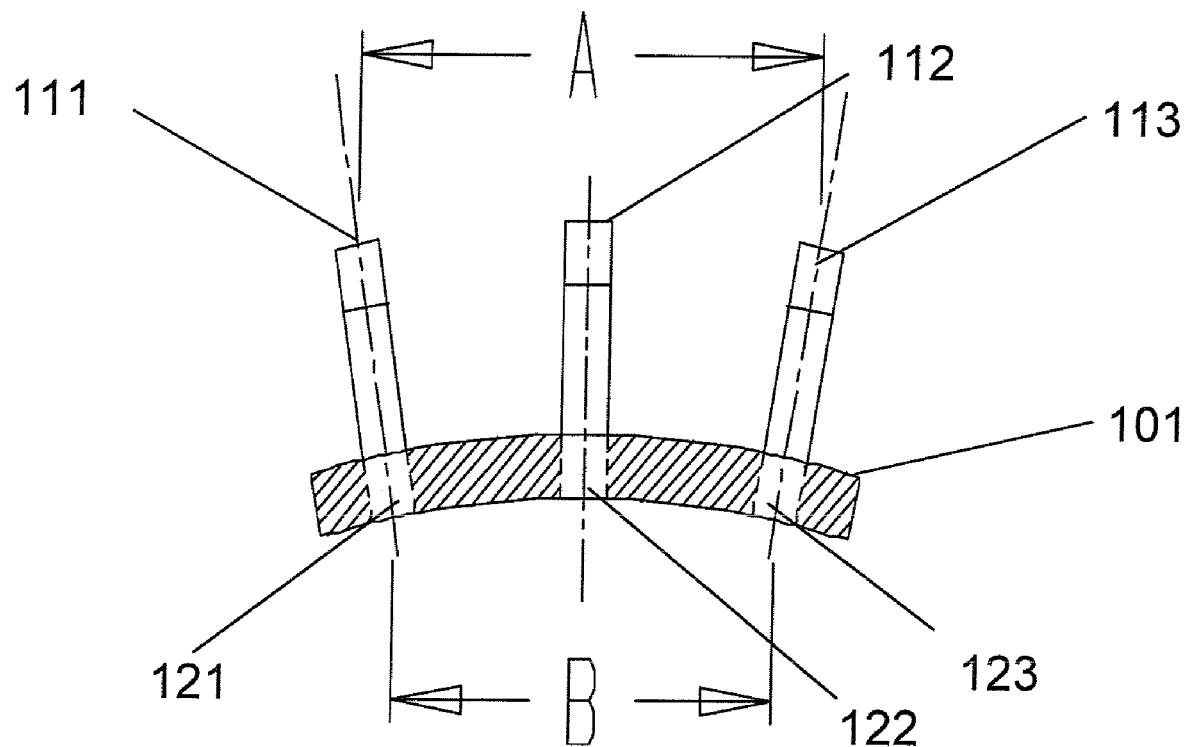
FIG. 11 is a simplified cross sectional elevation, subjected to a simplified case of thermal distortion.
Figure 17:
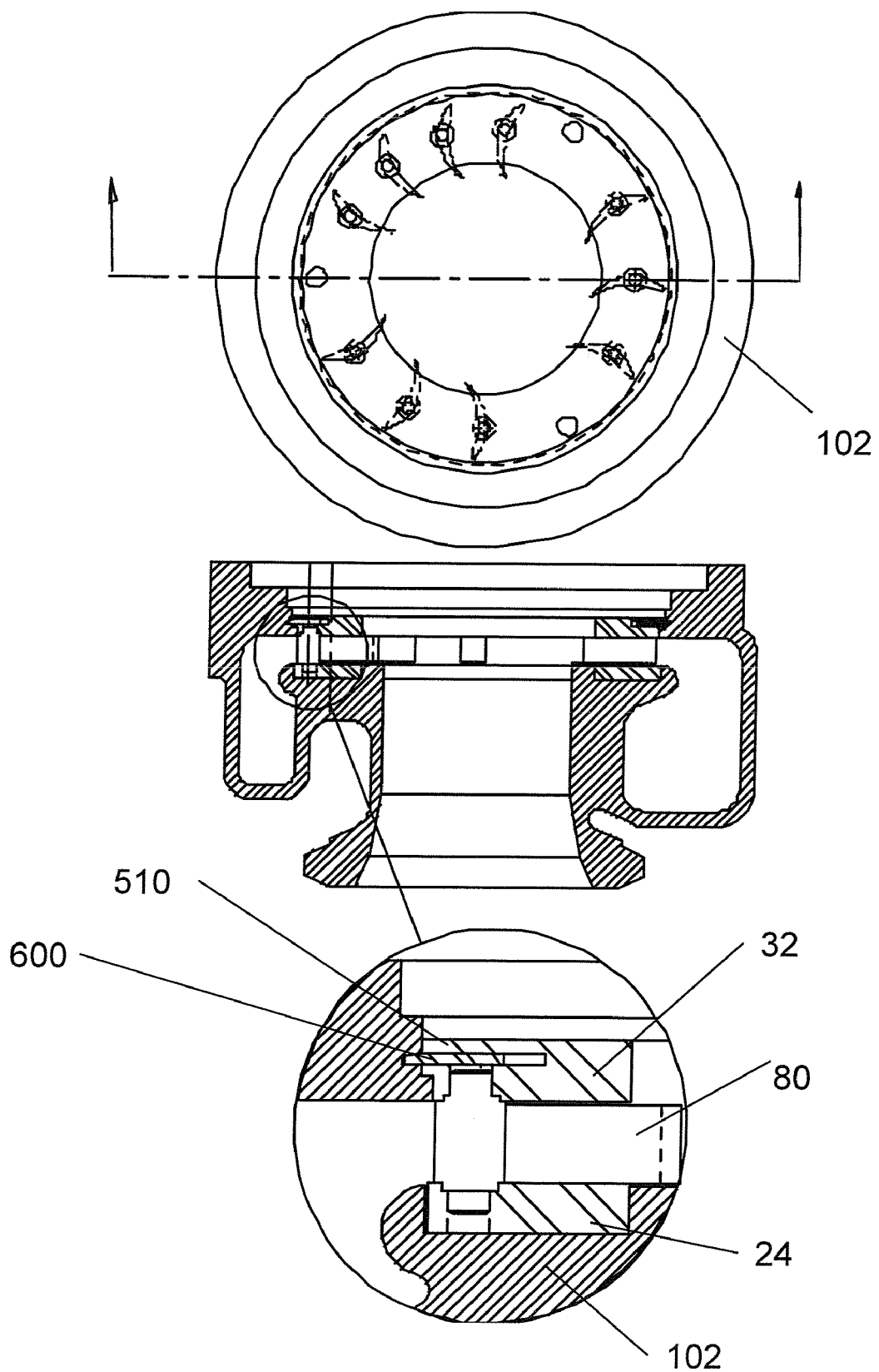
FIG. 17 is cross-sectional view of section A-A of a vane ring assembly with another embodiment of a retaining ring with a magnified view of the vane ring—retaining ring detail.

In FIG. 17, another exemplary embodiment of a vane assembly retaining member is shown for retaining the vane ring assembly to the housing (102) and is generally referred to by reference numeral (600). The retaining member (600) can still allow for radial thermal growth of the turbine housing (102) with respect to the vane ring assembly, or vice versa. The use of the term member is not intended to be limiting and the retaining member (600) can be any number of members, devices or a system that control or limit axial movement of the vane ring assembly with respect to the turbine housing (102), while allowing for differential thermal growth between the housing and the assembly. The retaining member (600) can be used with other components described above (for example a belville washer) with respect to FIG. 10, through 15.

Figure 18:
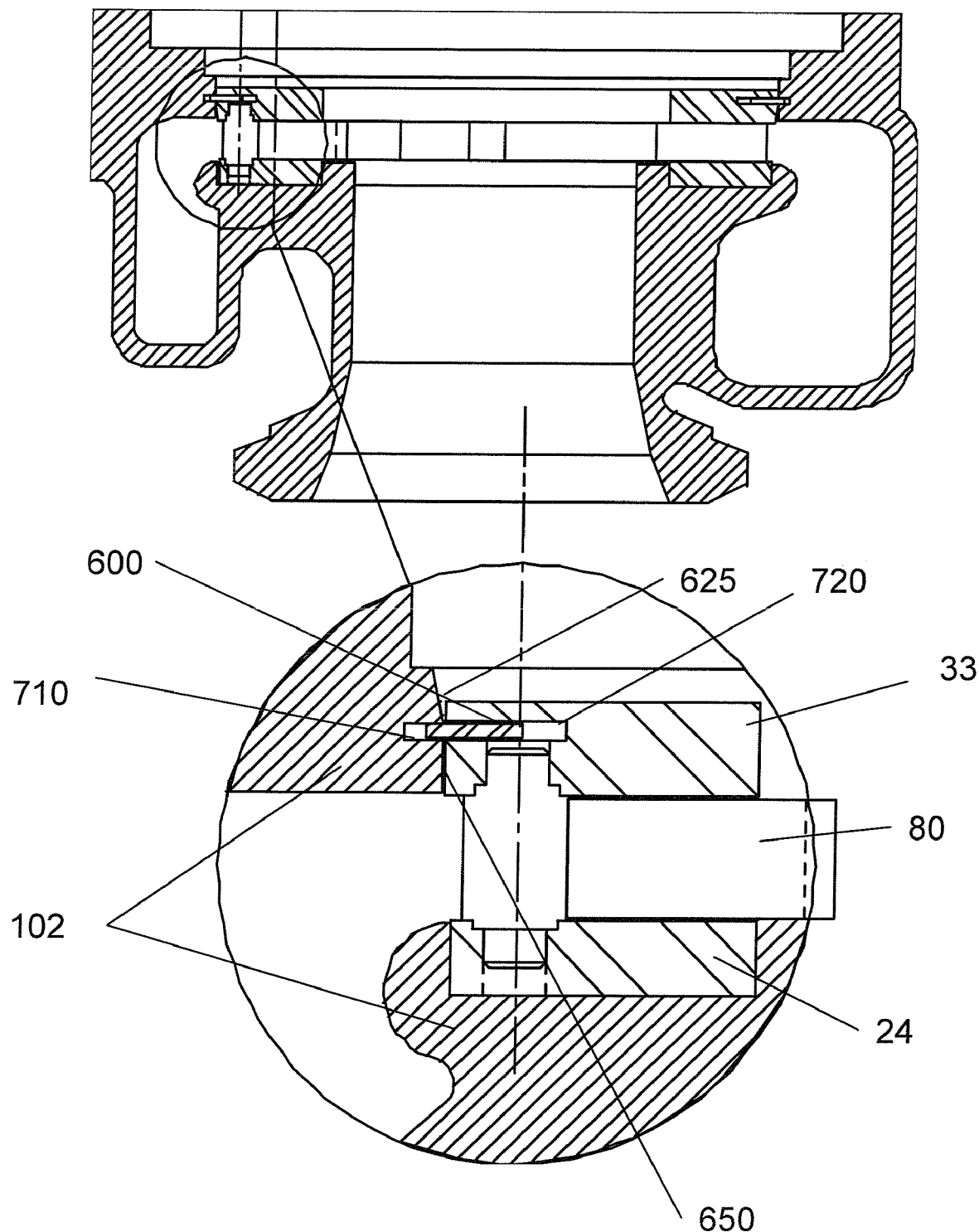
FIG. 18 is cross-sectional view of section A-A of a vane ring assembly with yet another embodiment of a retaining ring, using a tapered start for the retaining ring, with a magnified view of the vane ring—retaining ring detail.
Figure 19:
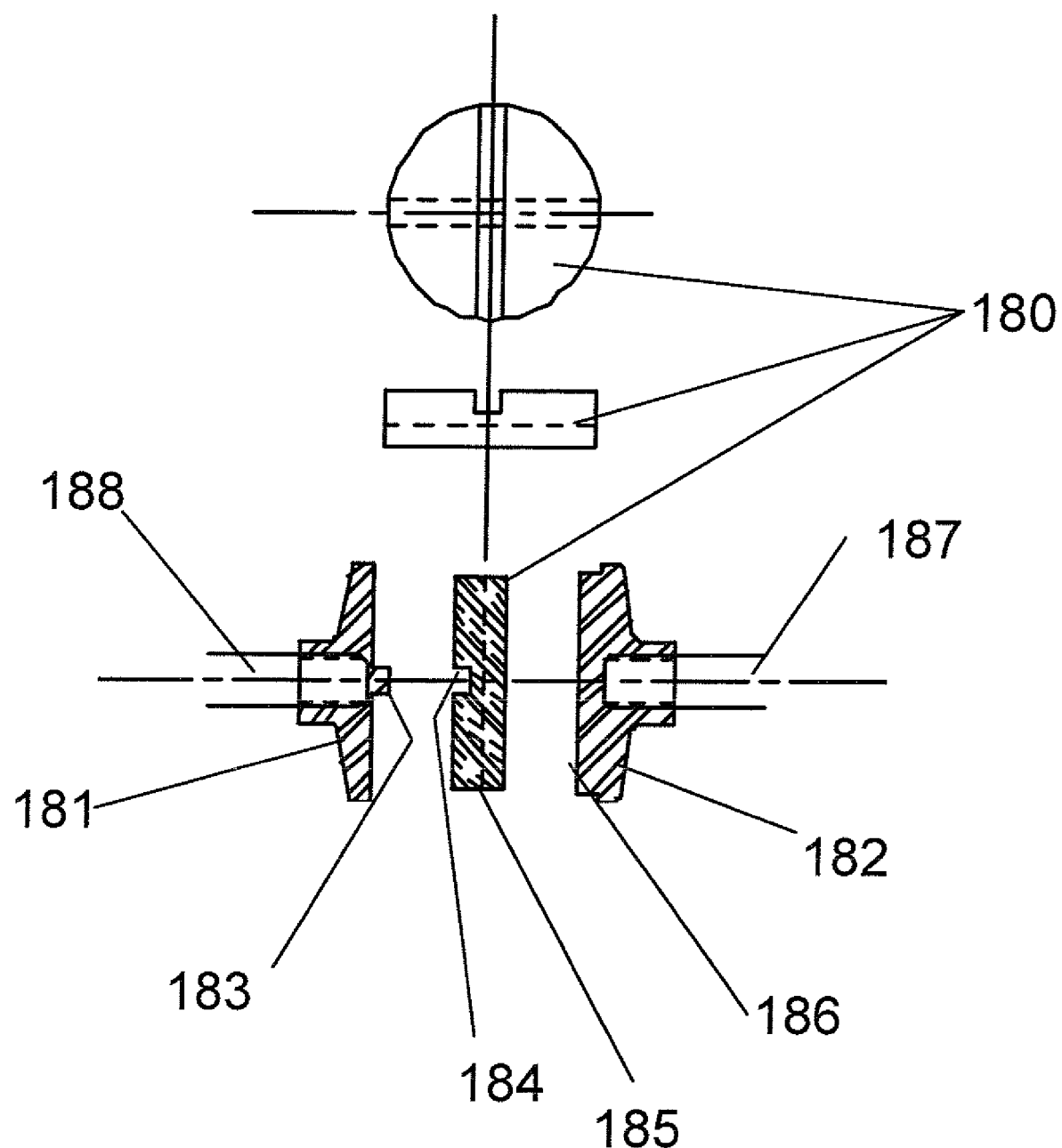
FIG. 19 is a sketch of a coaxial cross-key coupler.

Retaining member (600) can be a snap ring with many features similar to that of the snap ring (400). However, the retaining member (600) preferably can have a substantially uniform, rectangular cross-sectional shape. To facilitate assembly of the retaining member (600) with the turbine housing (102) and the vane ring assembly, a tapered or angled surface (625) is formed along one or both of the turbine housing and the support ring (shown only in the housing in FIG. 18). The tapered surface (625) allows an outer edge of the retaining member (600) to be moved such that the diameter of the ring is reduced, as the vane ring assembly is moved axially into position, to allow it to slide into position in the housing groove (710).

The retaining member (600) allows for limited radial movement of the turbine housing (102) with respect to the vane assembly, and vice versa while still restraining the housing and vane ring assembly in the axial direction. The retaining member (600) does not provide for ease of disassembly such as during service or remanufacture teardown operations. Unless the ring can be sprung out, one, or a section, of either the turbine housing, or the upper vane ring would have to be machined off to allow removal of the vane ring assembly. The retaining member (600) also allows for a tight tolerance along abutment region (650) between the turbine housing (102) and the vane ring assembly. Furthermore, by the nature of how the retaining ring is mounted, the retaining member (600) in the pair of grooves (710, 720) provides a robust seal for the reduction or elimination of exhaust gas leakage past the upper vane ring (33).

The use of a retaining member (600) facilitates assembly and disassembly since the ring can be contracted into the groove (720) of the vane ring for assembly and expanded for positioning in the groove (710) without the need for any other connection structure. However, the present disclosure also contemplates the use of other connection structures that can be used in combination with, or in place of, the retaining member (600).

In FIG. 17, the vane ring assembly can be connected to the housing (102) by a vane assembly retaining member (600). The retaining member (600) can be a rigid connection (in the axial direction) or otherwise limit movement along the axial direction. The retaining member can still allow for relative radial thermal growth between the turbine housing (102) and the vane ring assembly. The retaining member can also be used with any of the spacers and/or locating members, described with respect to FIGS. 13 to 16 to provide for relative radial thermal growth between the turbine housing (102) and the vane ring assembly. Although, the present disclosure contemplates the retaining member being used with other connection structures and techniques. Such other connection structures and techniques preferably allow for a differential radial thermal growth between the vane ring assembly and the turbine housing (102).

The retaining member (600) can be a retaining or snap ring that is positioned in a housing groove (710) and a vane assembly groove (720). Preferably, the retaining member (600) forms a nearly complete ring. However, the present disclosure contemplates the retaining ring being less than a nearly complete ring. The present disclosure also contemplates using a plurality of retaining members (600) that are only a portion of a complete ring (e.g., quarter arcs) and that can each be positioned in the grooves (710) and (720). The retaining member (600) can also be a plurality of snap rings that connect to a plurality of sets of grooves (710) and (720). While the present disclosure describes an annular retaining member (600), it is also contemplated to have other shapes for the retaining ring (with corresponding shapes for the grooves (710) and (720)), such as, for example, helical or spiral. The use of the term member is not intended to be limiting and the retaining member (600) can be any number of members, devices or a system that control or limit axial movement of the vane ring assembly with respect to the turbine housing (102), while allowing for differential thermal growth between the housing and the assembly.

The grooves (710) and (720) are preferably annular grooves that circumscribe an entire inner surface of a portion of the housing (102) and an outer surface of the vane ring assembly, respectively. By circumscribing the entire housing (102) and vane ring assembly, the grooves (710) and (720) allow for assembly of the retaining member (600), in this example a snap ring with the grooves at any orientation in order to facilitate assembly. However, the present disclosure also contemplates grooves (710) and (720) that circumscribe only a portion of one or both of the housing (102) and vane ring assembly, such as for positioning of the snap ring at a particular desired orientation.

In the exemplary embodiment, the groove (720) is formed along the circumference of the vane ring (33), although the present disclosure contemplates positioning the snap ring (600) in grooves along other portions of the vane ring assembly. The present disclosure also contemplates forming the vane assembly groove (720) along other vane ring assembly components.

The exemplary embodiments above have been described with respect to a vane ring assembly that adjusts vane position to control exhaust gas flow to the turbine rotor. However, it should be understood that the present disclosure contemplates providing a system or method of connection for a vane ring assembly that controls flow of a compressible fluid to the compressor rotor. The present disclosure further contemplates the use of the assembly system described herein for a turbocharger having both variable turbine geometry and variable compressor geometry. Such an arrangement for a variable compressor geometry can have many of the components described above for the variable turbine geometry, as well as other components known in the art.

While the invention has been described by reference to a specific embodiment chosen for purposes of illustration, it should be apparent that numerous modifications could be made thereto by those skilled in the art without departing from the spirit and scope of the invention.

Now that the invention has been described,

I claim:

1. A turbocharger comprising
   a turbine housing having at least one recess (510) adapted to receiving an axially expandable elastic retaining member (400, 600),
   vane ring assembly comprising a lower vane ring (23), a upper vane ring (31), and one or more guide vanes (80) pivotably positioned at least partially between said lower and upper vane rings, and at least one spacer (49, 50, 59) positioned between said lower and upper vane rings (23, 31) for maintaining an axial space between said lower and upper vane rings (23, 31), and
   an axially expandable elastic retaining member (400, 600) cooperating with said recess in said turbine housing for axially locating said vane ring assembly in said turbine housing.

2. The turbocharger of claim 1, wherein the at least one recess (510) in the turbine housing is a circumscribing groove.

3. The turbocharger of claim 1, wherein the axially expandable elastic retaining member (400, 600) is a snap ring.

4. The turbocharger of claim 1, wherein the axially expandable elastic retaining member (400, 600) is a snap ring with a chamfered edge (425), and wherein the at least one recess (510) is a circumscribing groove with an angled surface (515) providing a ramp against which diametral expansion of the retaining ring drives the retaining ring axially towards the vane ring assembly.

5. The turbocharger of claim 1, wherein the upper vane ring (33) has an axially circumscribing groove (720), and wherein said axially expandable elastic retaining member (400, 600) is located partially in said groove.

6. The turbocharger of claim 5, wherein the turbine housing includes a conical tapering surface (625) for contracting said axially expandable elastic retaining member (400, 600) on it's way to being seated in the recess (510) in the turbine housing.

7. The turbocharger of claim 1, further including an axially biased member in said at least one recess (510).

8. The turbocharger of claim 7, wherein between said axially biased member is a belville washer (401).

9. A method for assembling a turbocharger, said turbocharger comprising a turbine housing having at least one recess (510) adapted to receiving an axially expandable elastic retaining member (400, 600), and vane ring assembly comprising a lower vane ring (23), a upper vane ring (31), and one or more guide vanes (80) pivotably positioned at least partially between said lower and upper vane rings, and at least one spacer (49, 50, 59) positioned between said lower and upper vane rings (23, 31) for maintaining an axial space between said lower and upper vane rings (23, 31), said method comprising:

sliding said vane ring assembly into said turbine housing, and inserting an axially expandable elastic retaining member (400, 600) into said recess (510) in said turbine housing thereby axially locating said vane ring assembly in said turbine housing.

10. A method as in claim 9, wherein the upper vane ring (33) has an axially circumscribing groove (720), and wherein said axially expandable elastic retaining member (400, 600) is located partially in said groove, such that sliding said vane ring assembly into said turbine housing simultaneously seats said retaining member in said recess (510) in said turbine housing.

\* \* \* \* \*